(12) United States Patent
Katzenmeyer et al.

(10) Patent No.: US 11,644,301 B1
(45) Date of Patent: May 9, 2023

(54) SYSTEM AND METHOD OF PHASE-LOCKED FIBER INTERFEROMETRY

(71) Applicant: National Technology & Engineering Solutions of Sandia, LLC, Albuquerque, NM (US)

(72) Inventors: Aaron Michael Katzenmeyer, Albuquerque, NM (US); Christopher Todd DeRose, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 53 days.

(21) Appl. No.: 17/540,500

(22) Filed: Dec. 2, 2021

Related U.S. Application Data

(60) Provisional application No. 63/127,368, filed on Dec. 18, 2020.

(51) Int. Cl.
*G01B 9/02015* (2022.01)
*G01B 9/02055* (2022.01)
*H04B 10/63* (2013.01)

(52) U.S. Cl.
CPC ..... *G01B 9/02015* (2013.01); *G01B 9/02067* (2013.01); *H04B 10/63* (2013.01); *G01B 2290/45* (2013.01); *G01B 2290/60* (2013.01); *G01B 2290/70* (2013.01)

(58) Field of Classification Search
CPC ............ G01B 9/02015; G01B 9/02067; G01B 2290/45; G01B 2290/60
See application file for complete search history.

(56) References Cited

U.S. PATENT DOCUMENTS

| | | | | |
|---|---|---|---|---|
| 5,598,264 | A | * | 1/1997 | Failes .................... G01D 5/266 356/480 |
| 2005/0018201 | A1 | * | 1/2005 | de Boer ............... A61B 5/0066 356/479 |
| 2019/0049312 | A1 | * | 2/2019 | Strandjord ............ G01J 9/0246 |
| 2019/0346739 | A1 | * | 11/2019 | Lukens ................. G02F 1/3544 |

OTHER PUBLICATIONS

Katzenmeyer, A. M. et al., "Volumetric Imaging and Characterization of Focusing Waveguide Grating Couplers," IEEE Photonics Journal, 2017, vol. 9, 2701009, 10 pages.
Jackson, D. A. et al., "Elimination of Drift in a Single-Mode Optical Fiber Interferometer Using a Piezoelectrically Stretched Coiled Fiber," Applied Optics, 1980, vol. 19, pp. 2926-2929.

(Continued)

*Primary Examiner* — Michael A Lyons
(74) *Attorney, Agent, or Firm* — Martin I. Finston; Mark A. Dodd

(57) ABSTRACT

A system and method are provided for optical homodyne detection in an optical fiber interferometer. A detection signal is obtained by interfering an optical data signal with a phase-modulated optical reference signal. The modulator for the optical reference signal is phase-locked to an oscillatory modulation waveform. In embodiments, the modulator includes a piezoelectric element. In more specific embodiments, the modulator is a piezoelectric optical fiber-stretcher.

13 Claims, 6 Drawing Sheets

(56) References Cited

OTHER PUBLICATIONS

Jackson, D. A. et al., "Measurement of Small Phase Shifts Using a Single-Mode Optical-Fiber Interferometer," Optics Letters, 1980, vol. 5, pp. 139-141.
Roggenbuck, A. et al., "Using a Fiber Stretcher as a Fast Phase Modulator in a Continuous Wave Terahertz Spectrometer," Journal of the Optical Society of America B, 2012, vol. 29, pp. 614-620.
Mei, H. et al., "Piezoelectric Optical Fiber Stretcher for Application in an Atmospheric Optical Turbulence Sensor," Applied Optics, 2007, vol. 46, pp. 4371-4375.
Katzenmeyer, A. M., "Phase-Locked Fiber Interferometer with High Frequency, Low Voltage Fiber-Stretcher and Application to Optical Field Reconstruction," Proceedings of SPIE, 2020, vol. 11276, Optical Components and Materials XVII, pp. 1127609-1-1127609-7.

\* cited by examiner

SYSTEM AND METHOD OF PHASE-LOCKED FIBER INTERFEROMETRY

CROSS-REFERENCE TO RELATED APPLICATION

This application claims priority to U.S. Provisional Application Ser. No. 63/127,368, filed Dec. 18, 2020 under the title, "SYSTEM AND METHOD OF PHASE-LOCKED FIBER INTERFEROMETRY," the entirety of which is hereby incorporated herein by reference.

ACKNOWLEDGEMENT OF GOVERNMENT SUPPORT

This invention was made with United States Government support under Contract No. DE-NA0003525 between National Technology & Engineering Solutions of Sandia, LLC and the United States Department of Energy/National Nuclear Security Administration. The United States Government has certain rights in this invention.

FIELD OF THE INVENTION

The invention relates to methods and apparatus of optical fiber interferometry, and more particularly to applications of optical fiber interferometry for the sensing of optical fields.

ART BACKGROUND

Optical interferometry is a sensitive technique for measuring the phase of a light wave. Because the phase is affected by optical interactions of many kinds, there are numerous types of sensors whose function is based, at least in part, on interferometric measurement or detection. For example, interferometry is used in some gyroscopes, hydrophones, and thermometers.

Optical interferometry is also useful for metrology and for various imaging techniques including holography and optical coherence tomography. In these and other applications, interferometric techniques have been shown to be a viable approach for extracting the full set of information carried by an optical field, which includes not only the phase, but also the amplitude and the polarization.

In some kinds of interferometers, the optical signals propagate mainly over paths in free space, whereas in other kinds of interferometers, the optical signals are confined within lightguiding paths such as optical fibers. For some applications, fiber-based optical systems offer significant advantages over their free-space counterparts. For example, fiber-based systems tend to be compact, they do not generally require alignment, they can often be designed without bulky optics or optomechanical mounts, they can include optical paths with unusual geometries, and they have protected beam paths.

Fiber-based systems are also attractive because of the ready availability of commercial off-the-shelf fiber-based and fiber-coupled components such as laser diodes, polarization controllers, splitters, and combiners.

However, fiber-based systems have the drawback that they are susceptible to phase drift. That is, mechanical movements and thermal fluctuations lead to phase perturbations. When these perturbations are unequal between the signal and reference arms of the interferometer, they can cause the measured signal intensity to drift randomly between the sum and difference limits of the output signal.

Heterodyne detection techniques are useful for mitigating phase drift. In heterodyne detection, however, a component such as an acousto-optic modulator (AOM) must be used to shift the frequency of the optical signal. This is disadvantageous for at least some applications, because an AOM will typically have relatively high power requirements, and it will add insertion losses into the optical system. In some cases, system designers may also wish to avoid using AOM components or the like because of expense or physical bulk.

In homodyne detection systems, phase drift can be mitigated using phase-locking techniques. In one possible approach, controlled propagation delay in an optical fiber of variable length is used to compensate for phase error. Such an approach is described, for example, in D.A. Jackson et al., "Elimination of drift in a single-mode optical fiber interferometer using a piezoelectrically stretched coiled fiber," Applied Optics 19 (17) (1980) 2926-2929 (hereinafter, "Jackson AO1980"), the entirety of which is hereby incorporated herein by reference.

As described in Jackson AO1980, the interferometer is stabilized by a fiber-stretcher in which a length of optical fiber is wrapped multiple times around a piezoelectric cylinder. Application of a voltage waveform to the piezoelectric cylinder causes mechanical stretching of the fiber, which in turn modulates the phase of the exiting light.

A similar approach has been proposed for not only stabilizing the interferometer, but also for extracting phase information of the sample arm. A useful reference in this regard is D.A. Jackson et al., "Measurement of small phase shifts using a single-mode optical-fiber interferometer," Optics Letters 5(4) (1980) 139-141, the entirety of which is hereby incorporated herein by reference.

Although such an approach is useful, it is challenging because unless the mechanical response of the stretcher is rigorously known over the full range of operation, the phase of the signal in the sample arm cannot be determined with accuracy. Also, there may be hysteresis in the response function of the stretcher. This would make it especially difficult to interpret the signal when scanning, or under other conditions in which the phase is sometimes increasing and sometimes decreasing over time.

Accordingly, there is still a need for a homodyne fiber interferometer that is stabilized against phase drift and that can potentially enjoy some or all of the advantages of low cost, low power, low loss, and small physical footprint.

SUMMARY OF THE INVENTION

We have developed a new homodyne fiber interferometer system that is potentially useful for measuring the amplitude, phase, and polarization of a sampled optical field. It has phase stabilization provided by a piezoelectric transducer. It has the advantages of an all-fiber-optic system. In embodiments, it can be made at low cost and with a small physical footprint. The power requirement of our system can be as low as 1.25 mW or less.

The optical path in our system has a reference arm and a sample arm. Within the sample arm, light can be delivered to a sample and collected from the sample for detection. For some applications, the sample may be an unbroken portion of the optical fiber path that is designated for exposure to an environment for thermal, mechanical, or chemical sensing or the like. For other applications, there may be a break in the optical fiber path for introduction of an extraneous solid, liquid, or gaseous sample.

In some embodiments, an extraneous sample situated in a break in the optical fiber path can be scanned in two, or even in three, dimensions to assess its optical properties. The results of such a scan can, in some cases, be used for three-dimensional imaging of the sample. On the light-collection side of the sample, it may be possible to use near-field optical scanning to obtain image information with spatial resolution beyond the diffraction limit.

In embodiments, the piezoelectric transducer is a fiber-stretcher in which a length of optical fiber is wound around a piezoelectric cylinder, and the cylinder is driven with a periodic waveform from a function generator. We found that with only a moderate voltage amplitude, the driving signal for the transducer could produce a change of fiber length equal to many optical wavelengths and hence, to many full cycles of phase modulation.

As a consequence, the frequency of phase modulation is upconverted from the frequency of the driving signal in accordance with the change of fiber length that is produced. Increasing the amplitude of the driving signal will increase the frequency of phase modulation, even for a fixed driving signal frequency. This is especially important when the sample is to be scanned, because each pixel, of as many as one hundred or more pixels per line, requires several cycles of phase modulation to characterize the signal, and because the signal may contain abrupt phase changes that are detectable only with a relatively high detection bandwidth.

The periodic waveform that drives the modulator may oscillate at the mechanical resonance frequency of the piezoelectric cylinder. Driving at resonance is not critical. However, it may be desirable because it enables a substantially larger phase modulation for a given drive voltage, relative to non-resonant drive.

The phase modulation is useful to avoid signal fading that would otherwise arise in homodyne interferometry. In this regard, it resembles the avoidance of fading that is characteristic of heterodyne interferometry, but without the disadvantages mentioned above.

Another important feature of our system is that in addition to phase modulation, the driving signal also provides the compensating voltage for phase stabilization. That is, a phase error is detected in the reference arm of the system and fed back as an error signal. In the driving signal, the error signal is added to the phase-modulation waveform with the correct polarity to compensate the phase error.

Accordingly, the invention in a first aspect relates to a method for measuring an optical data signal collected from a sample in the signal arm of an optical fiber interferometer having a signal arm and a reference arm that are optically combined onto a signal photodetector. Such a method includes operations of injecting a source beam of light from a light source into the signal arm, generating an oscillatory modulation waveform having a frequency $f_{SG}$, driving a modulator in the reference arm with the oscillatory modulation waveform, and phase-locking the modulator to the oscillatory modulation waveform.

In the modulator, a reference beam of light from the light source is phase-modulated so as to produce oscillatory phase modulations that are phase-locked to the oscillatory modulation waveform. From the signal photodetector, an oscillatory detection signal is obtained that is responsive to a combined optical signal comprising the optical data signal and the modulated reference beam.

In embodiments, the method includes a further step of demodulating the oscillatory detection signal to obtain at least a phase measurement of the optical data signal. In various embodiments, the optical data signal may be collected by scanning an optical field in the signal arm of the interferometer. In some embodiments, for example, the scanning is conducted so as to collect two-dimensional or three-dimensional image data. In some embodiments, the optical data signal is collected in a multiplicity of sequential time intervals, and method further comprises determining changes in the optical data signal over time.

In embodiments, the modulator is phase-locked by adding an error signal to the oscillatory modulation waveform that drives the modulator. The error signal may be generated interferometrically. Thus, in embodiments, unmodulated light from the light source is interfered on a reference photodetector with a portion of the phase-modulated reference beam, and an oscillatory error-detection signal is obtained from the reference photodetector and subjected to low-pass filtering.

In embodiments, the modulator comprises a fiber-stretcher in which a length of optical fiber is wrapped around a piezoelectric cylinder.

In embodiments, the oscillatory modulation waveform drives the modulator to produce a multiplicity of oscillations in the phase modulation for each oscillation in the oscillatory modulation waveform, whereby the frequency $f_{PM}$ of the oscillatory detection signal is more than twice the frequency $f_{SG}$ of the oscillatory modulation waveform.

The invention in a second aspect relates to an optical homodyne detection system. The system includes an optical fiber interferometer having a signal arm and a reference arm that are optically combined onto a signal photodetector. The signal arm includes a sample region, and the signal and reference arms are conformed to receive light from a light source.

The system further includes an optical phase-modulator in the reference arm for producing phase-modulated light, a signal generator that can be configured to generate an oscillatory modulation waveform, a source of an error signal, and a controller that can be configured to add the error signal to the oscillatory modulation waveform so as to produce a driving signal that drives the optical phase-modulator.

The source of the error signal comprises a reference photodetector configured to produce a reference interference signal in response to combination of light from the light source and phase-modulated light from the phase-modulator.

The system further comprises a low-pass filter that is configured to filter the reference interference signal so as to produce the error signal. The error signal is fed back to the controller in a feedback loop that phase-locks the phase-modulator to the oscillatory modulation waveform.

In embodiments, the phase-modulator comprises a fiber-stretcher in which a length of optical fiber is wrapped around a piezoelectric cylinder.

In embodiments, the phase-modulator is conformed to respond to the driving signal by producing a multiplicity of oscillations in the phase modulation for each oscillation in the oscillatory modulation waveform, whereby a frequency $f_{PM}$ of the phase modulation is more than twice a frequency $f_{SG}$ of the oscillatory modulation waveform.

DETAILED DESCRIPTION

Figure 1:
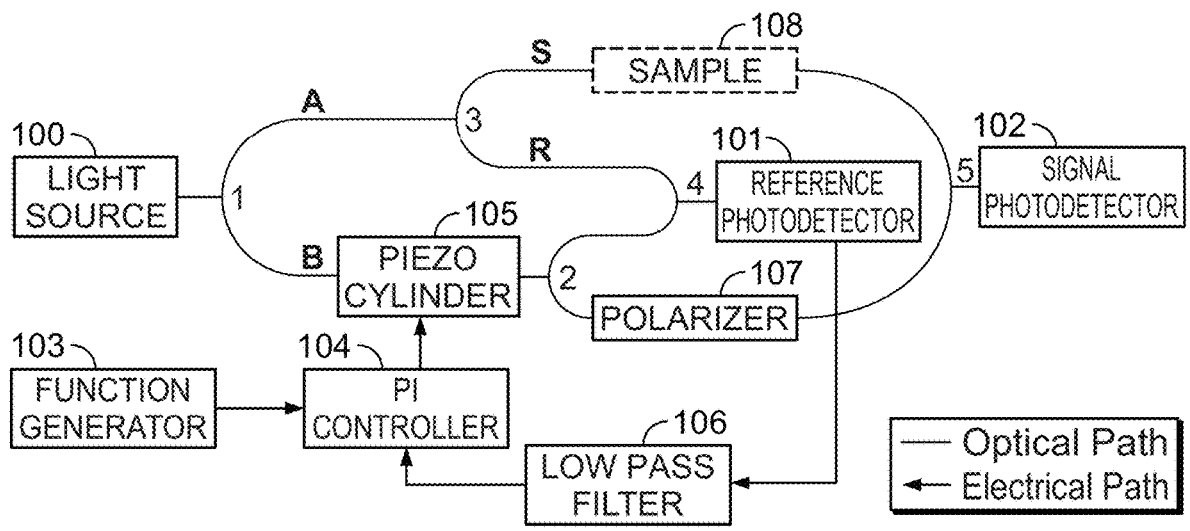
FIG. 1 is a high-level schematic diagram of the new interferometer system in an example embodiment.

FIG. 1 is a high-level schematic diagram of the new interferometer system in an example embodiment. The curving traces in the upper part of the figure represent the optical path, and the straight and right-angled traces in the lower part of the figure represent the path for electrical signals and control. Optical elements 1, 2, and 3 in the figure are fiber splitters or the like. Elements 4 and 5 are fiber combiners or the like. As shown in the figure, the input to each of these optical elements is on the left and the output is on the right.

As shown, light from a source 100 at left propagates through various elements to a reference photodetector 101 or a signal photodetector 102 near the right-hand side of the figure. The electrical signal from a function generator 103 at left passes to a PI controller 104, which produces the driving voltage for the piezoelectric cylinder 105. The error signal originates at the reference photodetector and travels along a feedback path through a low-pass filter 106 to the PI controller.

A polarizer 107, as shown in the figure, is optionally included for probing the polarization state of the signal from the sample. At the signal photodetector, polarized light from the polarizer will interfere only with signal components of the same polarization. Therefore, if the state of the polarizer is known, the detector response can be used to determine the signal polarization from the sample.

The light source will typically be a laser, although light sources of other kinds may be used, provided only that the light they produce is sufficiently coherent.

As shown in the figure, the optical output from the light source is split by element 1 into two branches, marked in the figure as branch A and branch B.

As explained in greater detail below, a portion of the light in branch A passes through the sample 108 and then terminates on the signal photodetector. Another portion of the light in branch A is used only to generate the error signal that is used for phase-stabilization. Meanwhile, the light in branch B is phase-modulated and phase-stabilized, optionally subjected to controlled polarization, combined with the branch-A light collected from the sample, and then terminated on the signal photodetector. The electrical output from the signal photodetector is an interference signal from which changes in the phase and amplitude of the sample light can be inferred.

The error signal is derived from an interference signal at the reference photodetector. The light beams that interfere at the reference photodetector are constituted by a portion of the light in branch A that does not pass through the sample, and a portion of the modulated light in branch B. A feedback path leads from the output of the reference photodetector to the modulator. Due to the feedback, the phase of the interference signal at the reference photodetector is locked with respect to the phase of the function generator signal. This locking of phase is what we refer to here as "phase-stabilization".

To measure the optical data signal collected from the sample, the interference signal at the signal photodetector can be compared to the interference signal at the reference photodetector to extract relative phase. The data-signal amplitude can be determined from the peak-peak value of the interference waveform.

Turning back to the figure, it will be seen that branch B of the fiber path goes to the modulator, marked in the figure as "piezo cylinder" 105. In the present example, the modulator is a fiber-stretcher in which a length of optical fiber is wound around a piezoelectric cylinder. The light in branch B is phase-modulated by the modulator in response to a driving voltage signal.

The driving voltage signal is a sum of two components, namely, a waveform from a function generator and an error signal from the reference photodetector. In the present example, these two components are combined in a PI controller, which feeds the driving voltage signal to the modulator.

By including the error signal as an additive component in the driving voltage signal, the system is able to phase-stabilize the light in branch B as well as to modulate it.

Element 2 splits the branch-B light exiting the modulator into two portions. As shown in the figure, one portion terminates on the reference photodetector, and the other portion terminates on the signal photodetector.

Turning back to branch A of the fiber path, it will be seen that element 3 splits this branch into two arms, namely, a sample arm S and a reference arm R.

The reference arm goes to the reference photodetector. Before terminating at the reference photodetector, the light in the reference arm is combined by element 4 with the reference portion of the branch-B light. The electrical output of the reference photodetector is an interference signal from which fluctuations in the optical phase of the branch A light can be inferred. The error signal is derived from this output.

Meanwhile, the light in the sample arm passes through the sample. The light collected from the sample continues on the sample arm to the signal photodetector. Before terminating at the signal photodetector, the sample light is combined by element 5 with the signal portion of the branch-B light. As explained above, changes in the phase and amplitude of the sample light can be inferred from the electrical output from the signal photodetector.

Turning again to the figure, it will be seen that after exiting the modulator, the signal portion of the branch-B light can pass through a polarizer 107. The polarizer is optional. Its purpose is to impart a known, controlled polarization to the signal portion of the branch-B light. By varying this polarization and observing responsive changes in the signal amplitude from the signal photodetector, it is possible to infer the polarization state of the sample light. The polarizer is typically set to the polarization state for which it is desired to determine the amplitude and phase of the data signal.

As noted above, the error signal is derived from the electrical output of the reference photodetector 101. As shown in the figure, the photodetector output is subjected to low-pass filtering to provide the error signal. The error signal is then combined with the waveform from the function generator to provide the driving voltage signal, as explained above. Thus, a feedback loop includes the reference photodetector 101, the low-pass filter 106, the PI controller 104, and the modulator 105.

More specifically, the low-pass filtered signal from the detector is a slow-moving voltage that is compared to a reference voltage to create the error signal. A typical choice for the reference voltage is a zero-crossing of the unfiltered signal. A positive value of the error signal indicates a lagging phase, and a negative value indicates a lagging leading phase. Subject to the gain in the PI controller, the error signal drives the voltage applied to the modulator above its normal value when the phase is lagging relative to a perfectly in-phase signal. Conversely, the error signal drives the applied voltage below its normal value when the phase is leading relative to a perfectly in-phase signal. As a general rule, the gain is chosen to be the highest that does not cause oscillation in the feedback loop.

In the present example, the error signal is summed with the waveform from the function generator at a PI controller. However, such an arrangement is provided as an illustrative example only, and does not exclude other possible arrangements from the scope of the invention. For example, it would be possible to use a P controller or a PID controller in place of the PI controller. If fast enough, the control could also possibly be implemented via software code.

The electrical output from the signal photodetector 102 can be demodulated to determine the amplitude and phase of the signal from the sample. As explained above, controlling the polarization of the phase-modulated light makes it possible to also discriminate the state of polarization of the light collected from the sample.

To determine phase information, one example approach is to plot the reference signal and the sample signal simultaneously on the oscilloscope. Since numerous cycles of $2\pi$ are traversed and unique features will also occur at the waveform edges, a shift between the two waveforms is readily discerned and can be used to determine the relative phase.

Figure 2:
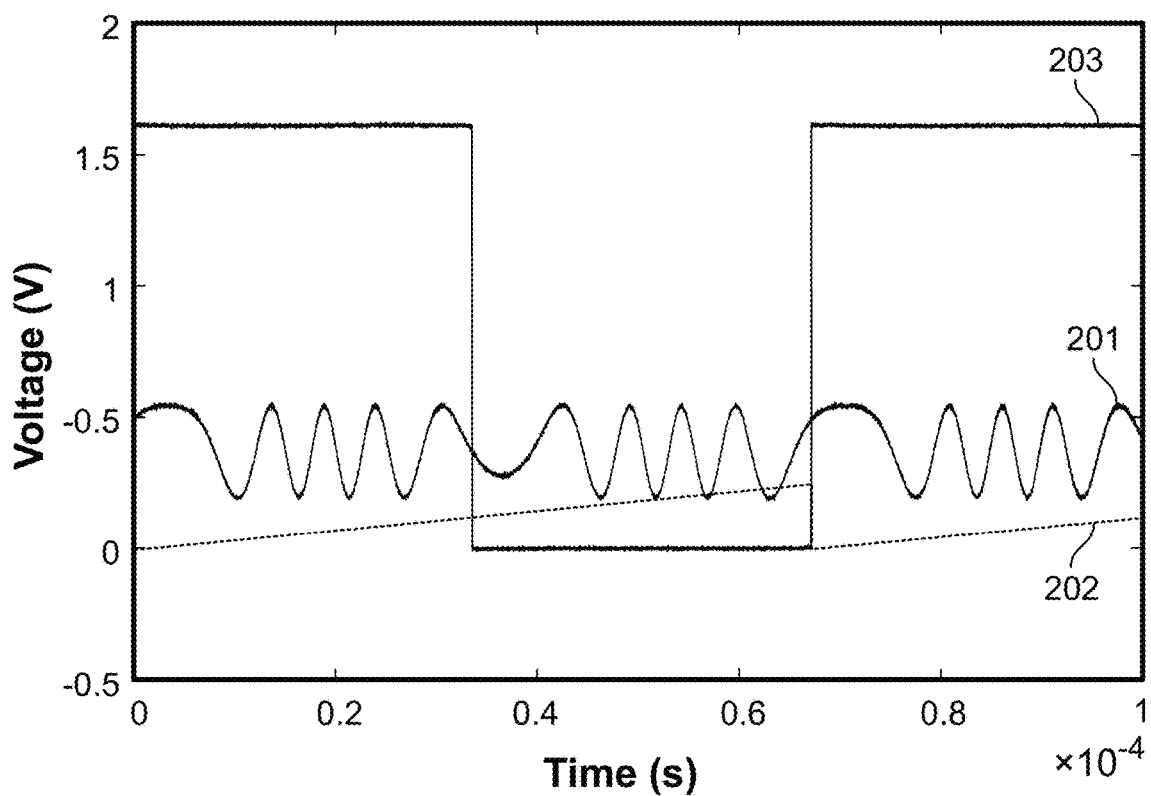
FIG. 2 is an example of typical output from the signal photodetector in an interferometric system of the kind described here.

FIG. 2 is an example of typical output 201 from the signal photodetector. It is a graph of voltage versus time that was obtained experimentally from a single point of a scanned sample. A periodic ramp function 202 is also plotted in the figure. The ramp function is the driving voltage signal from the function generator that produced the phase modulations seen in the detector output. A square wave 203 has also been plotted in the figure. It is the function-generator trigger signal.

It will be evident from the figure that the optical signal undergoes several full cycles of phase modulation (six are seen in the figure) per cycle of driving voltage signal applied to the modulator. The amplitude and phase of this waveform can be monitored over time. With scanning, the amplitude and phase can also be monitored over space. As explained above, the polarization can be monitored as well. With suitable probes, the system can be implemented not only as a sensing device, but also as a scanning microscope or scanning near-field microscope.

It is noteworthy in this regard that the upconversion of the modulation frequency makes it possible to obtain data on a microsecond timescale. This makes it tractable, for example, to extract data at each point in a large scanned measurement as well as to monitor rapidly evolving phenomena.

By way of illustration, experimental trials have shown that a driving signal only 100 mV in amplitude with a modest repetition rate of 15 kHz can create a modulated optical signal with greatest spectral content at 430 kHz. At that rate, a two-dimensional scan sampling 600 points over an area measuring 8 µm×8 µm can be completed in approximately ten seconds. That would afford enough time, before phase information is lost due to technological challenges, to acquire a multiplicity of two-dimensional sections for assembly into a three-dimensional image.

EXAMPLE

A modulator was constructed by coiling about 18.3 m of SM-600 optical fiber around a piezoelectric cylinder 68 mm in outside diameter and 25 mm in height with a resonant frequency of about 15 kHz. The fiber was wrapped in a single layer and affixed intermittently using cyanoacrylate adhesive. Fiber leading to and exiting from the unit was spliced to APC-terminated fiber of the same type.

Figure 3:
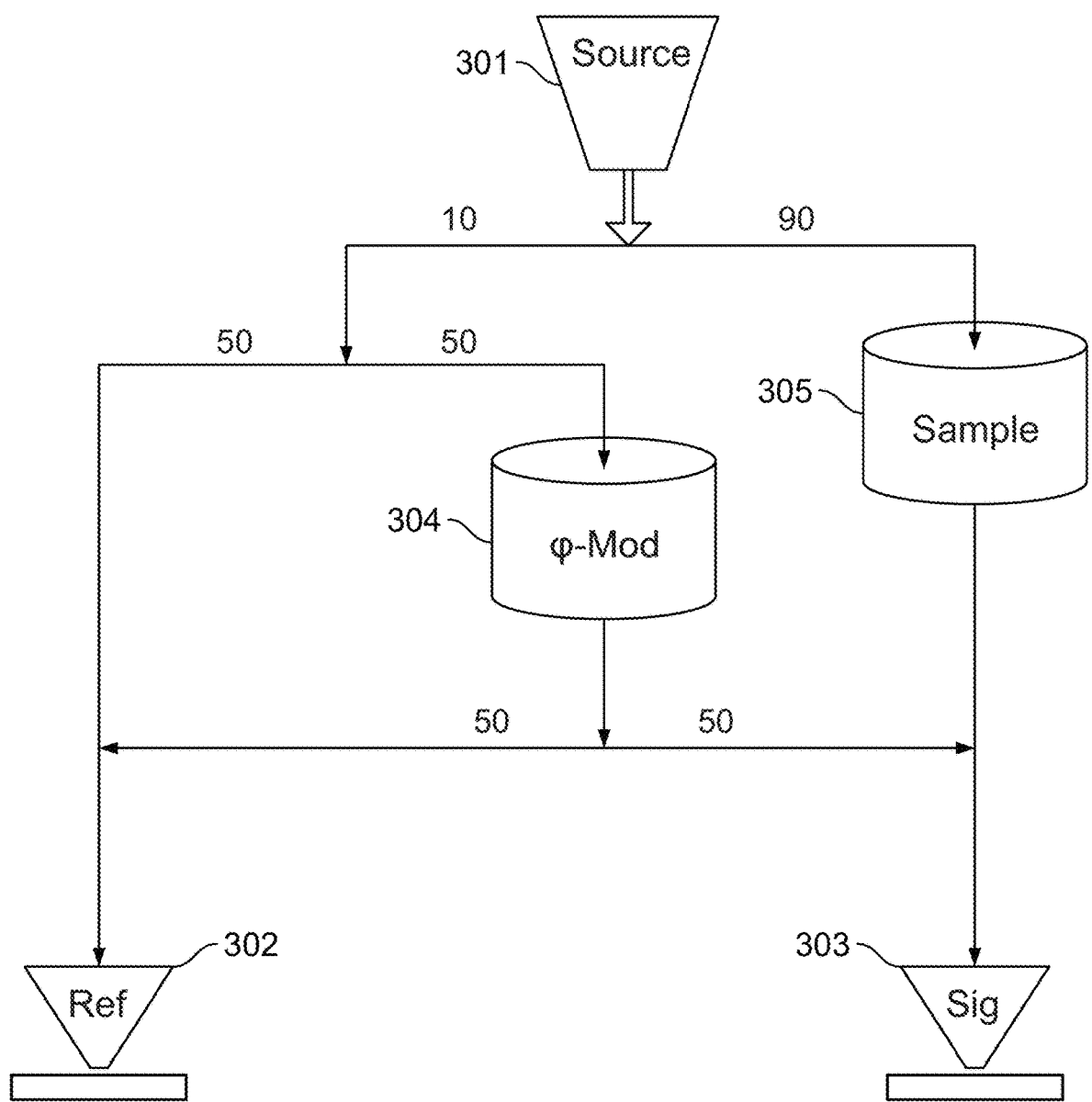
FIG. 3 is a tree diagram illustrating the distribution of optical power in the optical fiber path of an example interferometer system of the kind described here.

The optical and electrical subsystems were substantially as described above. The distribution of optical power from source 301 to reference detector 302 and signal detector 303 with paths through phase modulator 304 and sample 305 is illustrated in FIG. 3. The illustrated power distribution is exemplary only, and not limiting. Different power ratios might be desirable, for example, if the sample arm had much greater throughput than that afforded by a near-field probe as used in this example.

Figure 4:
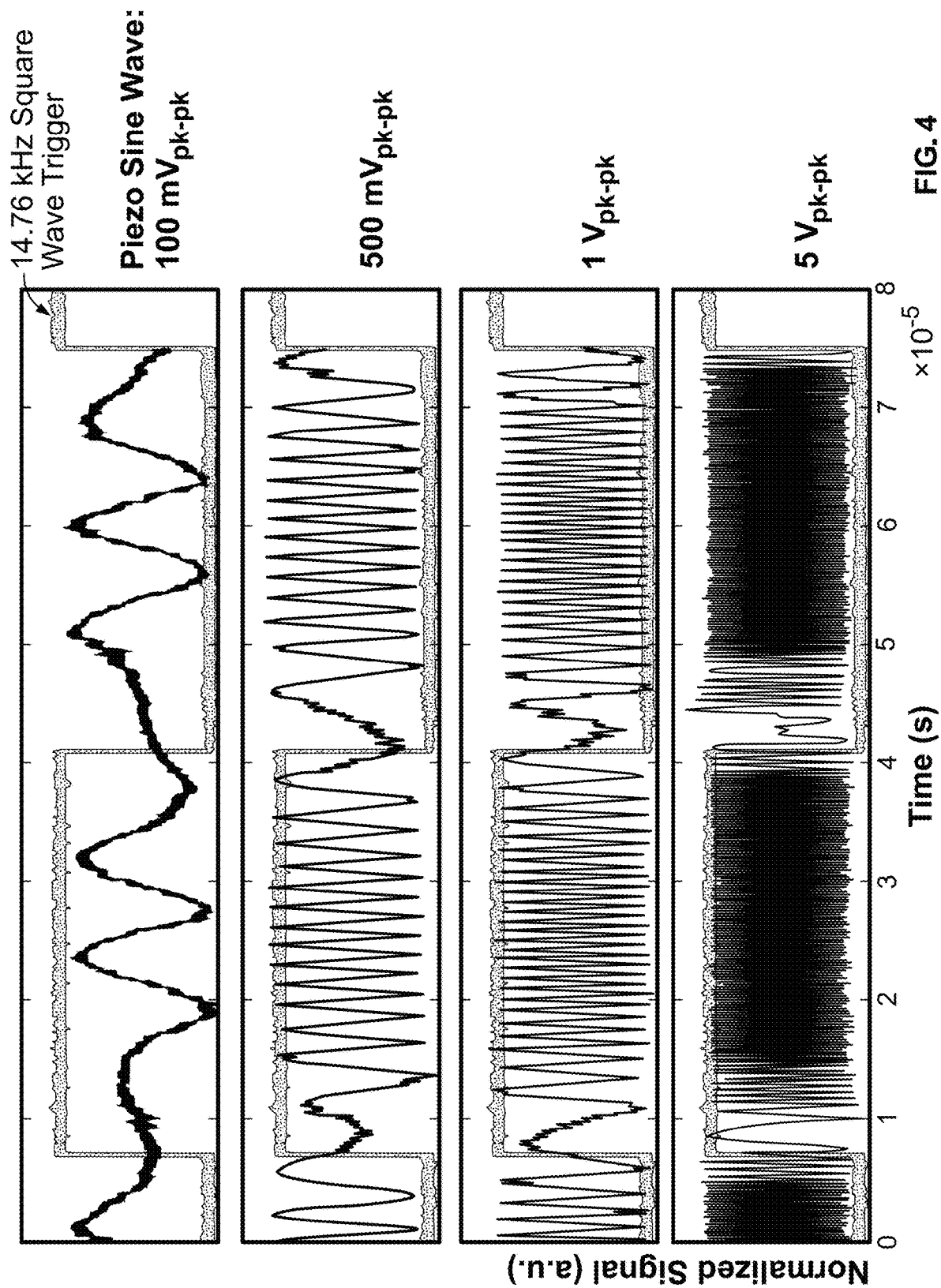
FIG. 4 shows four oscilloscope traces captured from the electrical output of the reference photodiode in an experimental demonstration of an interferometric system of the kind described here.

FIG. 4 shows four oscilloscope traces captured from the electrical output of the reference photodiode. The purpose of this figure is to demonstrate the capability of the fiber-stretcher for phase modulation. To generate these traces, the modulator was driven near resonance by a 14.76-kHz sine wave from a conventional function generator. Each of the four traces was generated with a different amplitude of the driving voltage signal. As indicated in the right-hand margin of the figure, the respective peak-to-peak voltage amplitudes were 100 mV, 500 mV, 1 V, and 5V. The trigger signal is seen as the 14.76-kHz square wave superimposed on each of the traces.

Figure 5:
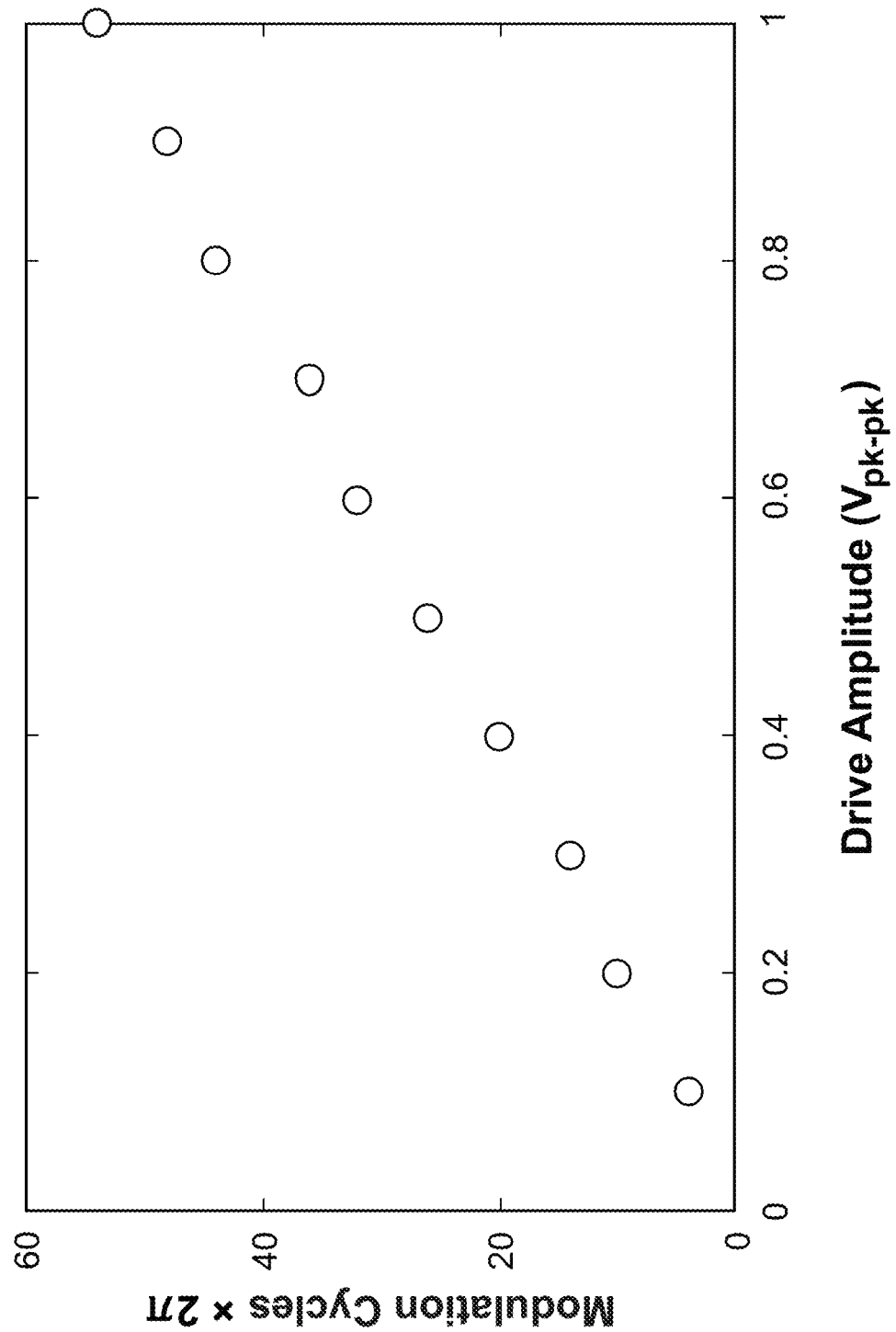
FIG. 5 is a graph illustrating the relationship between modulation frequency and the driving voltage for the modulator in an example interferometric system of the kind described here. The number of full 2 π phase cycles produced in the interferometric signal by the modulator per single 14.76-kHz cycle is plotted as a function of the driving voltage.

FIG. 5 is a plot of the number of full $2\pi$ phase cycles produced in the interferometric signal by the modulator per single 14.76-kHz cycle, as a function of the driving voltage. It will be appreciated from the figure that due to the upconversion, a nearly arbitrary effective phase modulation frequency may be chosen using a fixed-frequency driver.

It is also notable that the drive power is greatly reduced relative to the power requirements of an AOM. At a 100-mVpk-pk drive voltage, for example, the fiber stretcher was operated at a power of only 563 nW, which is less than typical AOM power requirements by six orders of magnitude. An effective frequency of 3.96 MHz was achieved with 5-Vpk-pk drive voltage.

Figure 6:
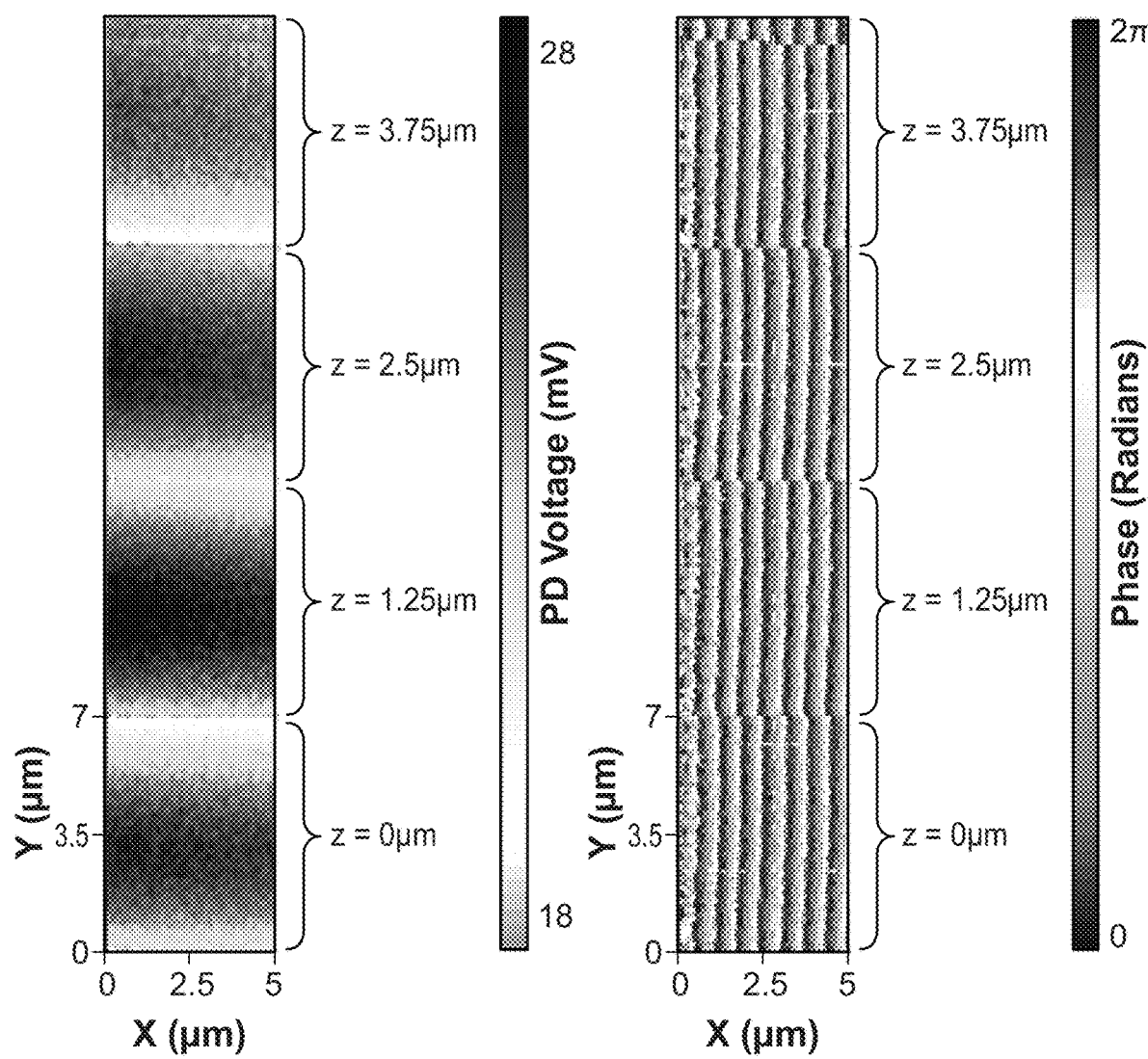
FIG. 6 provides an example of scanned images produced by an interferometric system of the kind described here. Shown in the figure are scanned amplitude and phase images of the optical emission from a lensed single-mode optical fiber.

We used our system to produce scanned amplitude and phase images of the optical emission from a lensed single-mode optical fiber. The images are shown in FIG. 6. The probe was a single-mode fiber cleaved flat. The x-axis was the beam axis. Images are shown in the figure at respective scan positions across the beam of z=0 µm, z=1.25 µm, z=2.5 µm, and z=3.75 µm. Amplitude images are shown on the left, and relative phase images are shown on the right. The images of both types are shown as intensity maps. The pixel resolution in each of the four sections was 66 nm×140 nm. The step size along the x-axis was 66 nm.

It will be seen in the figure that a phase change of 2 π was measured along the x-axis each ten steps (660 nm), which matches the specified laser wavelength to within the resolution of the step size.

Figure 7:
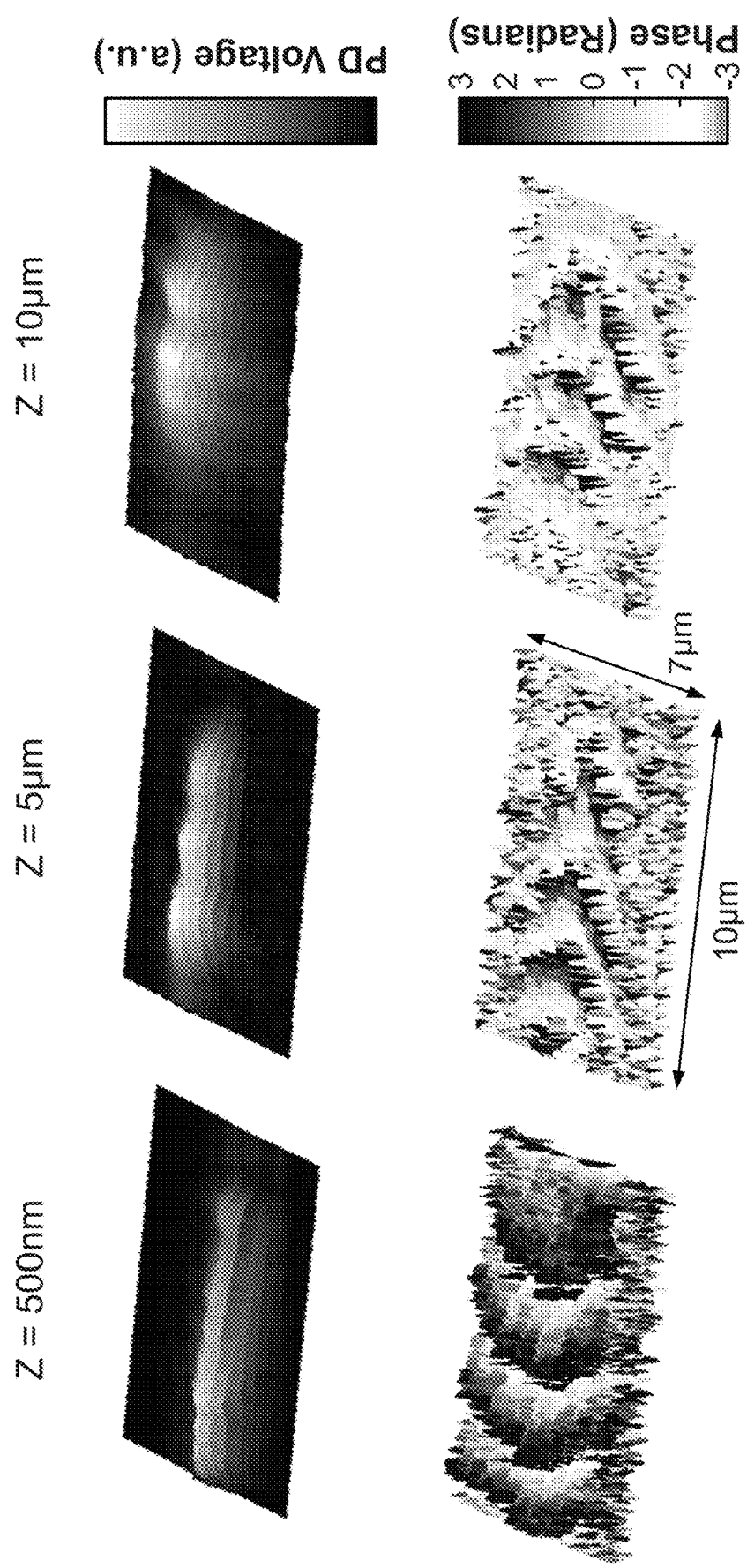
FIG. 7 provides a further example of scanned images produced by an interferometric system of the kind described here. Shown in the figure are scanned amplitude and phase images of a focusing waveguide grating coupler.

For a trial on a more complicated structure, we used our system to scan a focusing waveguide grating coupler. The resulting images are shown in FIG. 7.

A fiber probe with a nanoaperture was used in a scanning near-field optical microscope apparatus to collect the images. The probe was affixed to a quartz tuning fork to facilitate z-axis positioning, where the z-coordinate was the position above the sample surface. A lensed fiber was used to couple light into the waveguide.

Images were taken at positions z=500 nm, z=5 µm, and z=10 µm. The upper images are amplitude images, and the lower images are relative phase images. Both types of image are displayed as intensity maps. In sequence from left to right, the pixel resolution was 80 nm×280 nm, 100 nm×280 nm, and 100 nm×280 nm.

The evolution of the amplitude profile and phase fronts seen in the figure as the height increases is consistent with finite difference time domain (FDTD) simulations, including the inversion of the phase fronts from concave to convex profiles.

We claim:

1. A method for measuring an optical data signal collected from a sample in the signal arm of an optical fiber interferometer having a signal arm and a reference arm that are optically combined onto a signal photodetector, comprising:
    injecting a source beam of light from a light source into the signal arm;
    generating an oscillatory modulation waveform having a frequency $f_{SG}$;
    driving a modulator in the reference arm with the oscillatory modulation waveform;
    phase-locking the modulator to the oscillatory modulation waveform;
    in the modulator, phase-modulating a reference beam of light from the light source so as to produce oscillatory phase modulations with a frequency $f_{PM}$ that are phase-locked to the oscillatory modulation waveform; and
    obtaining from the signal photodetector an oscillatory detection signal with frequency $f_{PM}$ that is responsive to a combined optical signal comprising the optical data signal and the modulated reference beam.

2. The method of claim 1, further comprising obtaining at least a phase measurement of the optical data signal by demodulating the oscillatory detection signal.

3. The method of claim 1, wherein the modulator is phase-locked by adding an error signal to the oscillatory modulation waveform that drives the modulator.

4. The method of claim 1, wherein the modulator comprises a fiber-stretcher in which a length of optical fiber is wrapped around a piezoelectric cylinder.

5. The method of claim 1, wherein the oscillatory modulation waveform drives the modulator to produce a multiplicity of oscillations in the phase modulation for each oscillation in the oscillatory modulation waveform, whereby the frequency $f_{PM}$ is more than twice the frequency $f_{SG}$.

6. The method of claim 1, further comprising collecting the optical data signal by scanning an optical field in the signal arm of the interferometer.

7. The method of claim 6, wherein the scanning is conducted so as to collect two-dimensional or three-dimensional image data.

8. The method of claim 1, further comprising interferometrically generating the error signal.

9. The method of claim 8, wherein the interferometric generating of the error signal comprises:
    on a reference photodetector, interfering unmodulated light from the light source with a portion of the phase-modulated reference beam;
    obtaining from the reference photodetector an oscillatory error-detection signal; and
    low-pass filtering the oscillatory error-detection signal.

10. The method of claim 1, wherein the optical data signal is collected in a multiplicity of sequential time intervals, and method further comprises determining changes in the optical data signal over time.

11. An optical homodyne detection system, comprising:
    an optical fiber interferometer having a signal arm and a reference arm that are optically combined onto a signal photodetector, wherein the signal arm includes a sample region, and wherein the signal and reference arms are conformed to receive light from a light source;
    an optical phase-modulator in the reference arm for producing phase-modulated light;
    a signal generator configurable to generate an oscillatory modulation waveform;
    a source of an error signal; and
    a controller configurable to add the error signal to the oscillatory modulation waveform to produce a driving signal and to drive the optical phase-modulator with the driving signal, wherein:
    the source of the error signal comprises a reference photodetector configured to produce a reference interference signal in response to an optical input in which a portion of the light from the light source is combined with a portion of the phase-modulated light from the phase-modulator;
    the system further comprises a low-pass filter configured to filter the reference interference signal, thereby to produce the error signal; and
    the error signal is fed back to the controller in a feedback loop that phase-locks the phase-modulator to the oscillatory modulation waveform.

12. The optical homodyne detection system of claim 11, wherein the phase-modulator comprises a fiber-stretcher in which a length of optical fiber is wrapped around a piezoelectric cylinder.

13. The optical homodyne detection system of claim 11, wherein the phase-modulator is conformed to respond to the driving signal by producing a multiplicity of oscillations in the phase modulation for each oscillation in the oscillatory modulation waveform, whereby a frequency $f_{PM}$ of the phase modulation is more than twice a frequency $f_{SG}$ of the oscillatory modulation waveform.

* * * * *